Patented July 6, 1948

2,444,577

UNITED STATES PATENT OFFICE 2,444,577

SAUCE PREPARATION

Hideko Murata, Honolulu, Territory of Hawaii, assignor to King Shoyu Company, Honolulu, Hawaii, a partnership of Hawaii No Drawing. Application January 20, 1947, Serial No. 723,213

15 Claims. (Cl. 99—145)

This invention relates to sauce preparation and more particularly to a process for the production of shoyu, a Japanese type soy sauce.

The old process for making shoyu soy sauce that has been used for centuries in the Orient consists essentially in degrading soy bean proteins by enzymes produced by micro-organisms, particularly those enzymes produced by molds of the Aspergillus type. The product contains a high concentration of salt which is employed to impart a desired flavor and which, in addition, is present in the substance undergoing enzymatic degradation in order to inhibit the growth of undesirable micro-organisms, such as bacteria, during the process. As generally practiced, the old prior art process comprises mixing crushed ground soy beans with smaller quantities of crushed roasted grains, such as barley or wheat. Water is then added in amounts from two to five times the mass of the mixture and common salt is added to form an aqueous medium containing some 10% salt in solution. The resulting medium is then inoculated with a mold enzyme mixture and enzymatic degradation of the protein is allowed to take place slowly over a period of some months or years until the proteins have been hydrolyzed to the amino acids responsible for the flavor of the soy sauce. Normally six months to three years are required to produce a suitable product.

It is one object of this invention to provide a process for the production of a soy sauce which may be carried out in a few days.

A further object of this invention is the provision of a rapid and inexpensive process for the manufacture of soy sauce.

A further object of this invention is the provision of a process for the rapid production of a soy sauce that is comparable in taste and in composition to that produced by the older methods requiring a considerably longer period to complete.

A still further object of this invention is the production of shoyu, a Japanese type soy sauce, by a method utilizing close chemical controls of reactions and reactants to produce a standardized product in contrast with the old natural fermentation processes which are subject to little control and produce a product exceedingly variable in composition.

A still further object of this invention is the preparation of a soy sauce by a rapid and inexpensive method which may be readily controlled to produce a product having the desired flavor.

Further and additional objects will appear from the following description and the accompanying claims.

I have now discovered that an excellent soy sauce may be prepared from vegetable proteins without utilizing the slow process of enyzmatic degradation. In accordance with this invention, an excellent base for a soy sauce can readily be prepared by the rapid breakdown or hydrolysis of vegetable proteins at elevated temperatures by means of strong mineral acids. It has been found that the rapid hydrolysis of soy bean protein by mineral acids, such as hydrochloric acid, at elevated temperature results in a product having similar composition and taste characteristics to soy made by the old processes. The product comprises a mixture of amino acids, one of the more important of which is glutamic acid. Also it has been found that other vegetable proteins, such as the proteins of wheat or corn, result, upon mineral acid hydrolysis at elevated temperatures, in a similar composition but having somewhat different taste characteristics. However, in accordance with one embodiment of this invention, it has been discovered that soy bean protein in combination with another vegetable protein, such as zein or wheat gluten, may be hydrolyzed with a strong mineral acid, such as hydrochloric acid, at elevated temperatures to obtain a mixture of amino acids which on controlled neutralization gives a base entirely equivalent to that of fermented soy. By the subsequent addition of salt and caramel and/or other flavoring and coloring agents, there is produced a sauce of the shoyu type having properties entirely analogous to that produced by the older methods. This new method requires only four to five days for completion in contrast to the older fermentation methods which require weeks, months or even years to complete.

For a more complete understanding of this invention, reference will now be made to one example for carrying out this new process:

Example

A quantity of soy beans was softened by soaking overnight in warm water and a quantity of gluten was separately prepared from wheat flour by kneading the flour in flowing water in order to remove the starch. Into a flask of six liters' capacity there was placed three pounds of the wet softened soy beans and 7½ pounds of wet gluten. Thereafter three pounds of 20° Baumé hydrochloric acid were added. The acidified medium was then refluxed with a return condenser to prevent loss of liquid for a period of six hours in order completely to hydrolyze the proteins contained in the soy beans and the wheat gluten. The mixture was then neutralized with caustic soda to a pH value of about 5.5 and the hot liquor filtered. Sufficient water was added to provide a diluted filtrate having a specific gravity of about 18° Baumé. To this diluted filtrate was then added an equal quantity of 18° Baumé solution of sodium chloride. Caramel was added to impart the flavor desired and the resulting sauce was boiled for about one hour in an open kettle. (During this boiling the mixture may concentrate to between 19° and 24° Baumé.) The boiled mixture is then allowed to stand for three days and filtered. The resulting filtrate is the desired soy sauce of the shoyu type ready for use.

It is understood that the foregoing example may be subjected to many modifications without departing from the spirit and scope of the present invention. For example, the amount of gluten employed in the given example may vary from about 7½ to about 9 parts by weight and the amount of soy beans from about two to about three parts by weight in order to provide a final product having the desired chemical composition and taste characteristics. Generally speaking, the acid hydrolysis will be complete after boiling the protein mixture for a period of six hours. However, it has been found that the time of boiling may vary from three to eight hours depending upon the materials used and concentrations. Boiling for a period in excess of eight hours is usually unnecessary and may adversely affect the taste of the desired product.

In the specific example given, the hydrolysate was neutralized with caustic soda to a pH value of about 5.5. However, other alkaline materials may be used. Caustic soda is preferred, but if desired, sodium carbonate or sodium bicarbonate may be employed. Other alkaline reacting materials may be employed providing they do not spoil the taste of the product or form reaction products unsuitable in a food product. The final pH of the neutralized hydrolysate is preferably adjusted to range between 5.0 and 6.0 in order to provide a product having the desired taste characteristics and to permit the removal by filtration of the undesired insoluble matter. Prior to the addition of caramel or other flavoring agent, the specific gravity of the solution is preferably adjusted between 17° and 19° Baumé by dilution of water and/or the addition of salt.

In order to impart the desired flavor to the saline solution of hydrolysate, the caramel or other flavoring agent is added and the sauce is boiled in an open kettle. This boiling serves further to concentrate the sauce, thoroughly to incorporate the flavor of the caramel into the other ingredients of the sauce and to assist in the further precipitation of undesirable constituents from the solution.

In the foregoing example a principal source of protein material other than wheat gluten may be used although wheat gluten is preferred. For example, zein from corn is particularly useful, or other grain proteins (from oats, barley or rye) may be entirely satisfactory for use. Also other vegetable proteins such as those derived from peanuts may be employed. The use of such other materials, however, may vary to some extent the proportions of materials used and the actual conditions of preparation. However, an important feature of this invention is that the vegetable protein, whether derived from wheat or corn and/or soy bean, is hydrolyzed by a strong mineral acid under controlled conditions to provide a product which may be further treated as indicated to produce a product having the same taste characteristics as the soy sauce produced by the old prior art methods. By the uniform selection of protein reactants, a uniform product capable of standardization may readily be prepared.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:
1. A process for the production of a sauce which comprises preparing a mixture containing soy bean protein and another vegetable protein, adding a strong mineral acid to said mixture in an amount at least sufficient to hydrolyze substantially completely said proteins, heating said acidified mixture at the boiling temperature for a time sufficient to hydrolyze substantially completely said proteins, neutralizing the resulting hydrolysate to a pH value between about 5.0 and about 6.0, filtering the resulting neutralized medium, adding salt and caramel to the filtrate, concentrating the filtrate, and again filtering to produce the desired sauce.

2. The process recited in claim 1 wherein said other vegetable protein is wheat gluten.

3. The process recited in claim 1 wherein said other vegetable protein is zein.

4. A process for the production of a sauce which comprises preparing a mixture of water-softened soy beans and another vegetable protein, adding a strong mineral acid to said mixture in an amount at least sufficient to hydrolyze substantially completely said protein and the protein in said soy beans, boiling the acidified mixture under reflux for a period of between about three and about eight hours, neutralizing the resulting hydrolysate with an alkaline material to a pH value between about 5.0 and about 6.0, filtering the resulting medium, adding salt and caramel, concentrating to a Baumé of between about 19° and 24°, and filtering.

5. A process for the preparation of a sauce which comprises admixing water-softened soy beans and a vegetable protein, adding hydrochloric acid to the mixture in an amount sufficient at least to hydrolyze substantially completely said protein and the protein in said soy beans, boiling the acidified mixture at between 100° and 120° C. under reflux for a period between about three and about eight hours, adjusting the acidity of the resulting hydrolysate with an alkaline reacting compound of sodium, to a pH value between about 5.0 and about 6.0, filtering the hydrolysate, adjusting the specific gravity of the filtrate to between about 17° and about 19° Baumé, adding an equal quantity of a sodium chloride solution of between about 17° and about 19° Baumé to said filtrate, adding caramel, thereafter boiling the mixture whereby it is concentrated to a specific gravity between about 19° and 24° Baumé, allowing the concentrated mixture to stand for a period, and finally filtering.

6. The process recited in claim 5 wherein said vegetable protein is wheat gluten.

7. The process recited in claim 5 wherein said vegetable protein is zein.

8. The process recited in claim 5 wherein said alkaline reacting compound of sodium is sodium hydroxide.

9. The process recited in claim 5 wherein said alkaline reacting compound of sodium is a sodium carbonate.

10. In a process of preparing a sauce from a soy bean protein and another vegetable protein mixture, the step of substantially completely hydrolyzing in aqueous solution said protein mixture with a strong mineral acid under reflux conditions.

11. In a process of preparing a sauce from a mixture of a soy bean protein and another vegetable protein mixture, the steps of substantially completely hydrolyzing said proteins with a strong mineral acid, adjusting the acidity of the hydrolysate with an alkaline compound to a pH between about 5.0 and about 6.0, and thereafter incorporating salt and a flavoring agent to the neutralized product.

12. The process recited in claim 11 wherein said mineral acid is hydrochloric acid and wherein said alkaline compound is sodium hydroxide.

13. The process recited in claim 5 wherein the amount of said vegetable protein is greater than the amount of soy beans in the initial mixture.

14. The process recited in claim 1 wherein said other vegetable protein is present in an amount greater than said soy bean protein in the initial mixture subjected to acid hydrolysis.

15. A process for the production of a sauce base from water-softened wet soy beans and wet wheat gluten which comprises mixing between about two and about three parts by weight (wet basis) of water-softened soy beans and between about 7½ and about 9 parts by weight (wet basis) of wheat gluten, said wheat gluten being free of substantial quantities of water-soluble starch normally present therein, and completely hydrolyzing said mixture with a mineral acid at an elevated temperature.

HIDEKO MURATA.

REFERENCES CITED

The following references are of record in the file of this patent:

UNITED STATES PATENTS

| Number | Name | Date |
|---|---|---|
| 1,193,739 | Till | Aug. 8, 1916 |
| 1,992,462 | Barnett | Feb. 26, 1935 |
| 2,107,133 | Snelling | Feb. 1, 1938 |